United States Patent [19]

Trucco

[11] Patent Number: 4,572,570
[45] Date of Patent: Feb. 25, 1986

[54] FLEXIBLE TOP FOR SOFT-TOP MOTOR VEHICLES

[75] Inventor: Dario Trucco, Turin, Italy

[73] Assignee: Industrie Pininfarina S.p.A., Italy

[21] Appl. No.: 620,971

[22] Filed: Jun. 15, 1984

[30] Foreign Application Priority Data

Jun. 16, 1983 [IT] Italy .............................. 53471/83[U]

[51] Int. Cl.⁴ .................................................. B60J 1/00
[52] U.S. Cl. .................................... 296/107; 296/147
[58] Field of Search ............... 296/107, 108, 109, 114, 296/115, 116, 117, 147

[56] References Cited

U.S. PATENT DOCUMENTS

| | | |
|---|---|---|
| 2,798,763 | 7/1957 | Dujic .................................... 296/147 |
| 3,188,135 | 6/1965 | Bernstein ........................... 296/117 |
| 3,214,213 | 10/1965 | Hezler et al. ....................... 296/107 |
| 3,536,354 | 10/1970 | Ingram ................................ 296/107 |

Primary Examiner—Robert R. Song
Attorney, Agent, or Firm—Sughrue, Mion, Zinn, Macpeak & Seas

[57] ABSTRACT

A flexible top for soft-top motor vehicles, provided with an articulated framework which can assume an extended condition covering the passenger compartment of the motor vehicle and a folded non-covering condition, includes a rigid glass rear window having its lower edge provided with means for pivotal connection to the body of the motor vehicle so as to be displaceable between a raised operable position and a lowered rest position in which it is received within the passenger compartment of the motor vehicle.

5 Claims, 4 Drawing Figures

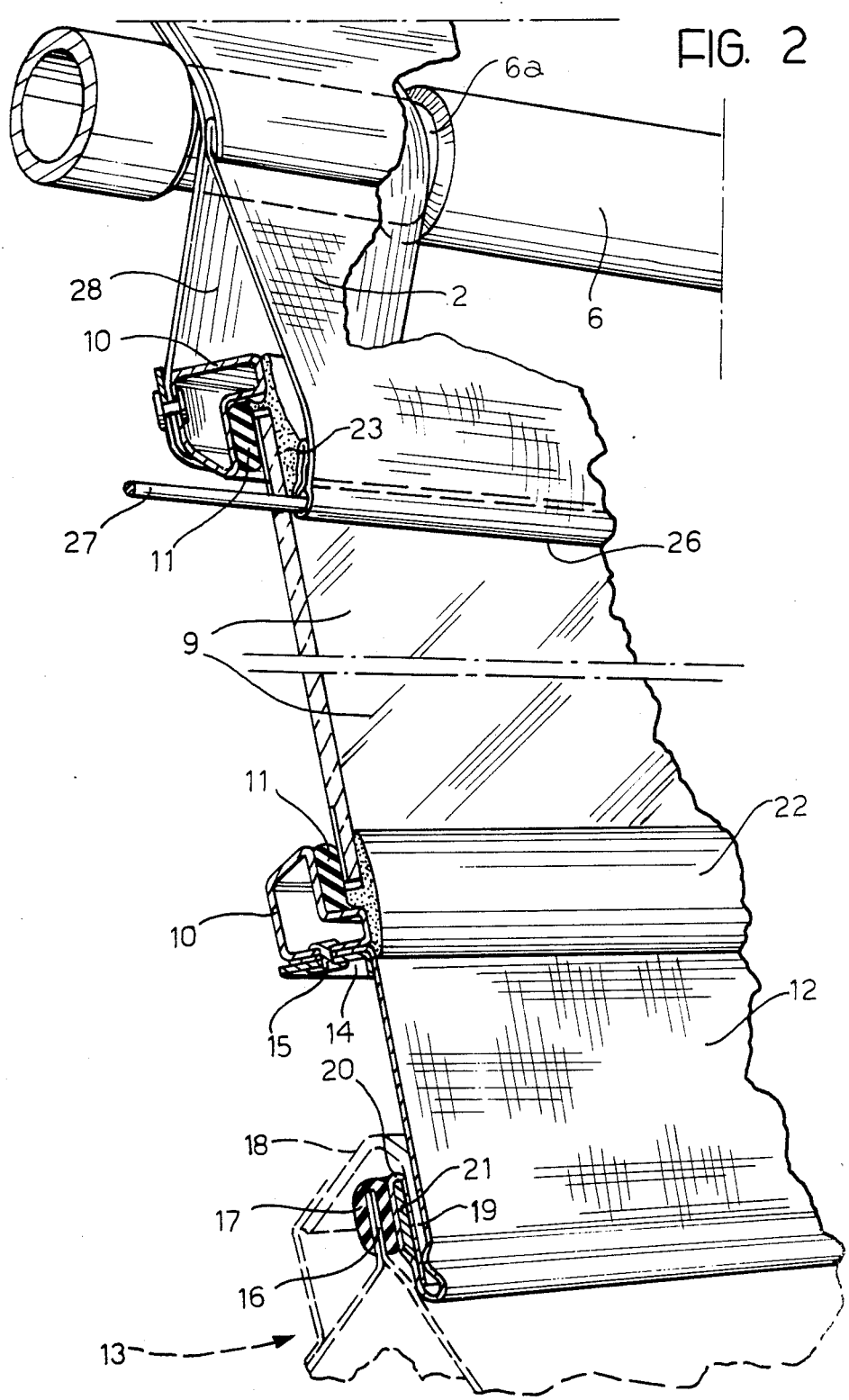

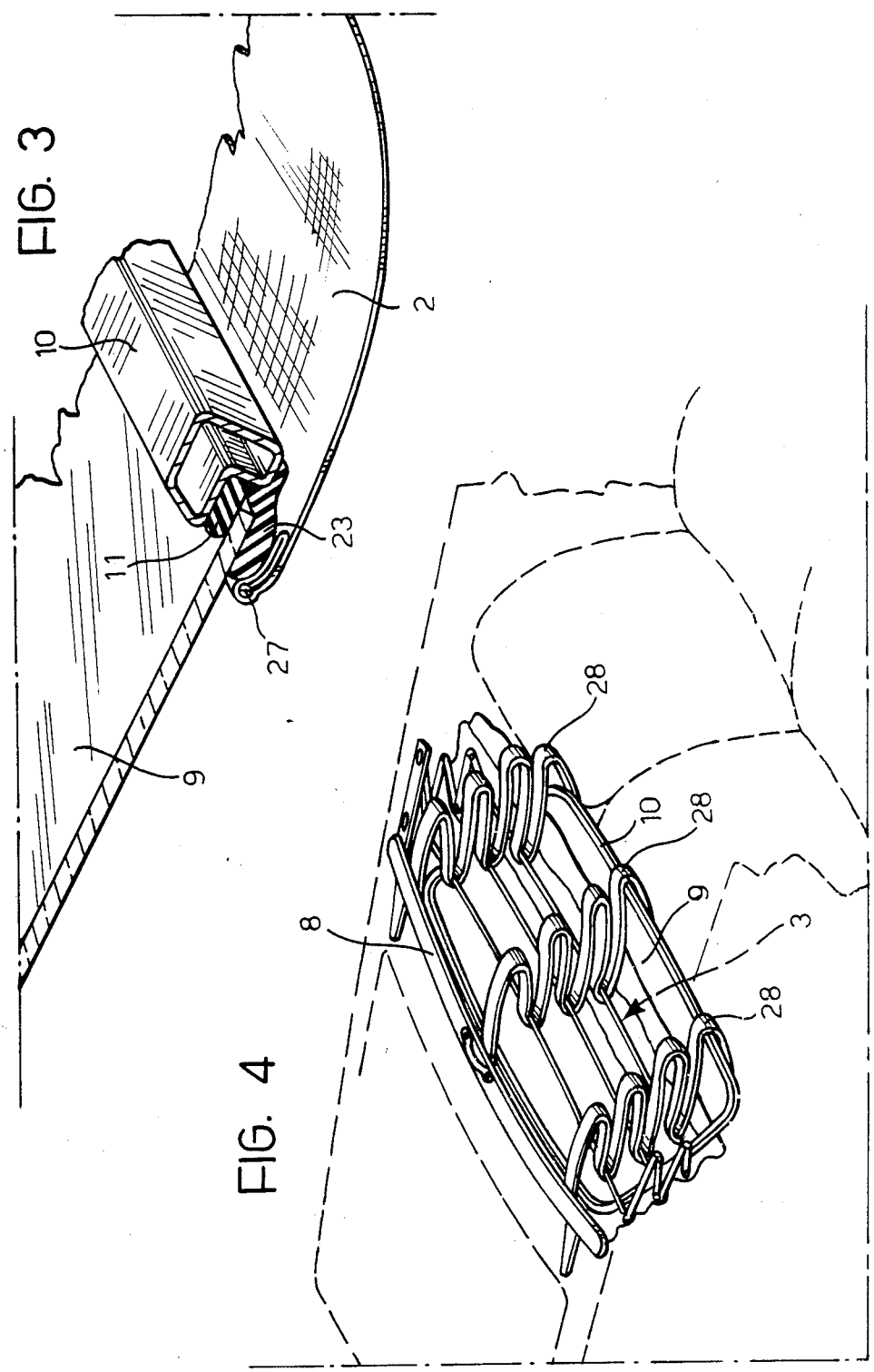

FLEXIBLE TOP FOR SOFT-TOP MOTOR VEHICLES

The present invention relates to flexible tops for soft-top motor vehicles, of the type provided with an articulated framework which can assume an extended, covering condition over the passenger compartment of the motor vehicle or a folded, non-covering condition.

Flexible tops of the type specified above usually incorporate a rear window of flexible plastics material. The use of a rear window of this type has the disadvantage that it easily deteriorates with time (so that it is necessary periodically to replace it) and it is not possible to use electrical resistances for defrosting or demisting.

On the other hand, rear windows of flexible plastics material have the advantage that, when the top is folded, they follow the movement of the cover without it being necessary for the user to perform supplementary operations to bring the rear window into its inoperative condition.

Flexible tops of the above-specified type provided with a glass rear window have also been used in order to avoid the above-mentioned disadvantages due to wear and the difficulty of defrosting and demisting. However, the solutions of this type made up to now require the performance of supplementary operations upon folding the top for the purpose of separating the rear window from the top and moving it to the inoperative condition.

The object of the present invention is that of avoiding the above-mentioned disadvantages by realising a flexible top provided with a glass rear window which will not require the performance of supplementary operations when the top is folded, in order to move the glass rear window to its inoperative position.

With a view to achieving this object, the subject of the present invention is a flexible top of the type specified initially, characterised by the fact that it includes a rigid glass rear window having its lower edge provided with means for pivotal connection to the body of the motor vehicle so as to be displaceable between a raised operative position and a lowered rest position in which it is received in the interior of the passenger compartment of the motor vehicle, by the fact that the flexible top has an aperture corresponding to the rear window and that, in the raised position of the rear window, the lateral and upper edges of this latter are in sealing contact with the inner surface of the top adjacent the edge of the said aperture, and by the fact that the flexible top is further provided with flexible connecting means which connect the rear window to the said top in such a way as to maintain this rear window in its raised position when the flexible top is in its extended covering condition.

By virtue of this characteristic, the glass rear window forming part of the top according to the invention automatically moves from its operative position to its rest position and vice versa by the simple effect of manual opening or closing movement of the top.

Preferably, the said connecting means include at least one flexible strip connected at one end to the upper edge of the rear window and at the other end to a front element of the framework for the top.

In one embodiment, the said means for pivotal connection of the rear window to the body of the motor vehicle comprise a strip of flexible material having a longitudinal edge connected to the lower edge of the rear window and an opposite longitudinal edge connected to the motor vehicle body.

The said rear window is further provided on its upper edge and on its two side edges with a seal which is in contact with the inner surface of the top in the raised position of the rear window.

Further characteristics and advantages of the present invention will become apparent from the following description with reference to the attached drawings, provided purely by way of non-limitative example, in which:

FIG. 2 is a partial perspective view, on an enlarged scale, corresponding to a section taken on the line II—II of FIG. 1;

FIG. 3 is a partial perspective view on an enlarged scale, corresponding to a section taken on the line III—III of FIG. 1; and FIG. 4 is a schematic perspective view which illustrates the top in the folded condition within the passenger compartment of the motor vehicle.

Figure 1:
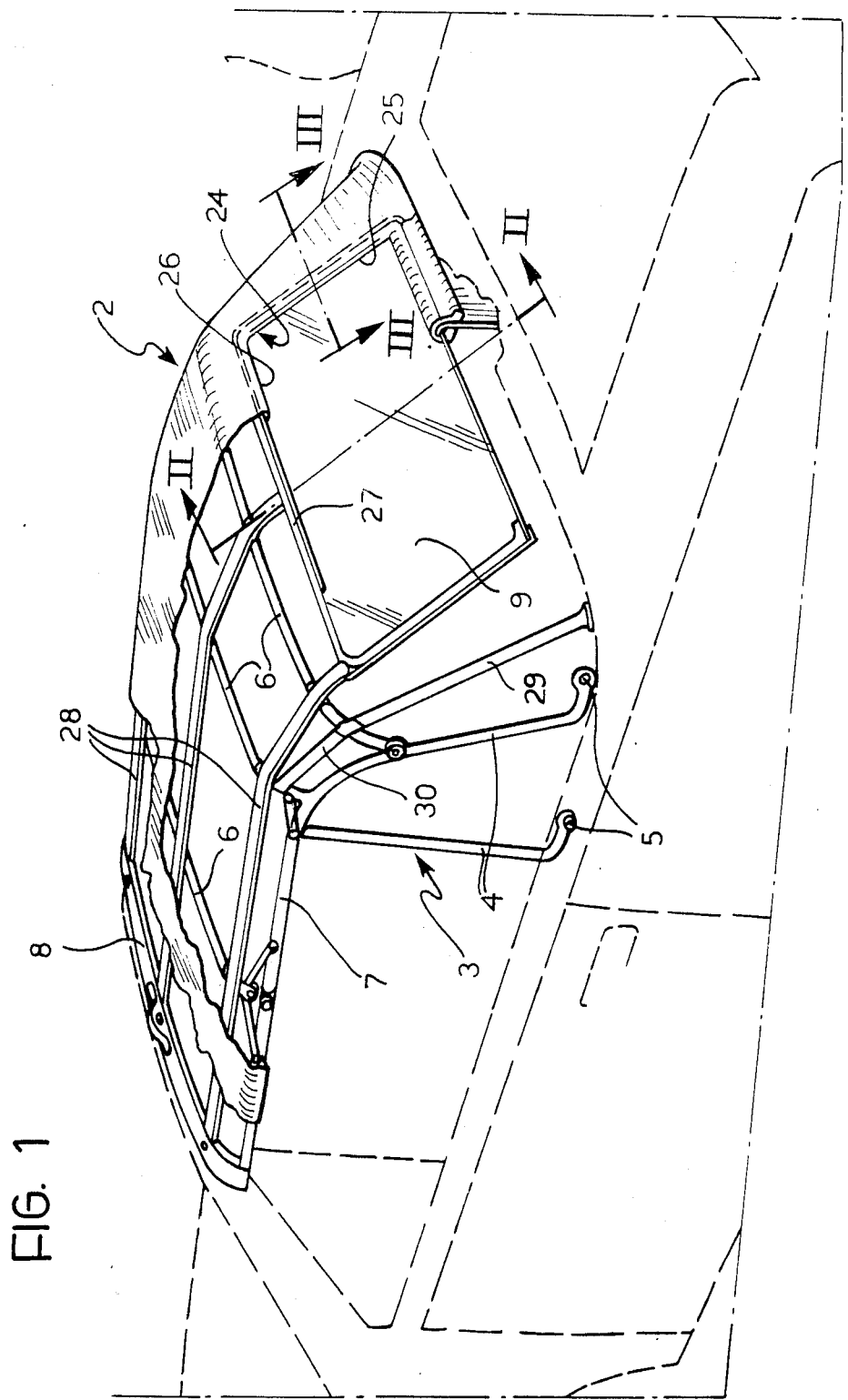
FIG. 1 is a sectioned perspective view of a top according to the present invention.

FIG. 1 partially illustrates, with broken lines, a motor vehicle 1 provided with a flexible top 2 which can assume an extended condition covering the passenger compartment (illustrated in FIG. 1), or a folded non-covering condition (illustrated in FIG. 4).

FIG. 1 is a rear perspective view of the top. The terms "rear" and "front" will be understood to refer to the top when mounted on a motor vehicle. Similarly the terms "longitudinal" and "longitudinally" are used here with reference to the longitudinal direction of the motor vehicle, whilst the terms "transverse" and "transversely" refer to a horizontal direction perpendicular to the longitudinal direction of the motor vehicle.

With reference to FIG. 1, the flexible top 2 is provided, in a manner known per se, with an internal articulated framework 3 including elements 4 articulated at 5 to the body of the motor vehicle adjacent the rear part of the top and a series of transverse bars 6 connecting two longitudinal side elements 7. These latter are connected at their front ends by a front cross piece 8 which is fixed to the upper edge of the windscreen structure of the motor vehicle to maintain the cover 2 in its extended condition illustrated in FIG. 1.

The flexible top 2 is provided with a rigid rear glass window 9.

As is illustrated in detail in FIG. 2, the rear window 9 is provided with a frame 10, constituted by shaped elements of sheet metal secured by means of a strip of adhesive 11 to the edges of the pane of the rear window 9.

The reference numeral 12 indicates a strip of flexible material which has one longitudinal edge joined to the lower edge of the rear window 9 and the opposite longitudinal edge joined to a part 13 of the body of the motor vehicle in such a way that the lower edge of the rear window 9 is connected pivotally to the body of the motor vehicle.

As illustrated in FIG. 2, the part of the flexible material strip 12 which is joined to the rear window 9 is clamped between the frame 10 and a transverse element 14 which is joined to the frame 10 by means of connecting members 15.

At the opposite edge of the strip 12, the part 13 of the motor vehicle body includes a flange 16 on which is mounted a seal 17. The motor vehicle body further includes a transverse element 18 having a part 19 parallel to and spaced from the seal 17. The longitudinal edge of the strip of flexible material 12 which is opposite that fixed to the rear window 9 is folded upon itself in such a way as to form a pocket 20 containing a reinforcing strip 21 made of plastics material. This part is interposed between the portion 19 of the sheet metal element 18 and the seal 17.

The deformability of the strip 12 allows the rear window 9 to be displaced between a raised operative position (illustrated in FIG. 1) corresponding to the extended condition of the top, and a lowered inoperative position (illustrated in FIG. 4) corresponding to the folded condition of the top 2.

With reference to FIG. 2, on the rear edge of the pane of the rear window 9 a seal 22 is secured by adhesive, which ensures a seal at the connection between the rear window and the strip of flexible material 12. To the upper edge and side edges of the pane of the rear window there is further adhered a seal 23.

At its rear side (see FIG. 1) the top 2 has an aperture 24 of inverted U-shape, having two lateral edges 25 (only one of which is visible in FIG. 1), and an upper edge 26. Along these edges 25, 26 the top is provided with a metal reinforcing wire 27.

When the rear window 9 is in the raised operative position illustrated in FIG. 1, the seal 23 is in sealing contact with the inner surface of the top 2 adjacent the edges 25, 26 of the aperture 24.

When the top 2 is in the extended condition illustrated in FIG. 1, the rear window 9 is maintained in its raised operative position by means of flexible connection means which, in the illustrated embodiment, are constituted by three flexible tapes 28 connected at one end to the upper edge of the rear window 9 and at the opposite end to the cross piece 8 of the inner framework 3.

The tapes 28 lie above the transverse elements 6 of the framework and are formed in such a way that, when the top is extended, they are maintained under tension and constrain the rear window 9 to remain in its raised operative position with the seal 23 in sealing contact with the inner surface of the top adjacent the edges of the aperture 24.

As illustrated in detail in FIG. 2, in correspondence with each tape 28, each transverse element 6 has a region 6a of reduced section in which the tape 28 can slide. Preferably, the said region 6a is surmounted by a bridge element (not illustrated) fixed to the element 6, on which the top rests. This latter is fixed, in a manner known per se, to the various elements of the framework.

The transverse element 6 of the articulated framework 3, which is immediately above the rear window 9 in the extended condition of the top, is articulated to the ends of the two longitudinal side elements 7 of the framework. For this reason, for the purpose of permitting the correct positioning of this element when the top is extended over the passenger compartment of the motor vehicle, it is necessary to provide at each end thereof an inextensible strip 29 which connects this element to the motor vehicle body and a resilient strip 30 which connects the same element to the transverse elements 6 adjacent to it.

The top 2 is finally provided internally with a lining which hides the framework and the tapes 28 from view.

When the flexible top 2 is moved from the extended condition illustrated in FIG. 1 to the folded condition illustrated in FIG. 4, the cross piece 8 is retracted to the position illustrated in FIG. 4 so that the tapes 28 fold upon themselves within the passenger compartment of the motor vehicle, allowing the rear window 9 to turn from its raised operative position to its lowered position illustrated in FIG. 4. When, on the other hand, the reverse movement is effected, the cross piece 8 puts the tapes 28 under tension, which draws the upper edge of the rear window 9 upwards to bring the rear window into the position illustrated in FIG. 1.

Naturally, the present invention is also applicable to other models which achieve the same utility by utilising the same innovative concept. For example, the tapes 28 could be replaced by metallic cables, or by any other type of articulated connection.

What is claimed is:

1. A flexible top for soft-top motor vehicles having an articulated framework which can assume an extended condition covering the passenger compartment of the motor vehicle and a folded, noncovering condition, wherein the improvement consists in:
    said flexible top including rigid glass rear window, a strip of flexible material having one longitudinal edge joined to the lower edge of said window and an opposite longitudinal edge joined to the body of the motor vehicle so that the window can be pivoted between a raised operative position and a lowered rest position in which it is received within said passenger compartment;
    said flexible top defining an aperture in correspondence with said rear window so that, in the raised position of said window, the lateral and upper edges of the latter are in sealing contact with the inner surface of said top adjacent the edge of said aperture and
    said flexible top being further provided with flexible connecting means which connect said rear window to said top in such a way as to maintain said window in its raised position when said top is in its extended covering condition,
    whereby the rear window is automatically displaced between its operative position and its rest position solely by the manual movements of opening and closing top.

2. A top according to claim 1, wherein said connecting means include at least one flexible tape connected at one end to the upper edge of said rear window and at its other end to a front framework element.

3. A top according to claim 2, wherein said articulated framework includes a series of longitudinally spaced transverse bars to which said top is joined and above which lies said at least one flexible tape, and each said bar has a part of reduced section in the region where said at least one tape passes.

4. A top according to claim 1, wherein a seal is provided on the upper edge and two lateral edges of said rear window.

5. A top according to claim 1 wherein a metal reinforcing wire is provided along the edge of said aperture.

* * * * *